United States Patent
Honda

(10) Patent No.: US 9,410,055 B2
(45) Date of Patent: Aug. 9, 2016

(54) POLYBENZOXAZOLE RESIN AND PRECURSOR THEREOF

(75) Inventor: Eiichi Honda, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 344 days.

(21) Appl. No.: 14/000,429

(22) PCT Filed: Apr. 4, 2012

(86) PCT No.: PCT/JP2012/059242
§ 371 (c)(1),
(2), (4) Date: Aug. 20, 2013

(87) PCT Pub. No.: WO2012/137840
PCT Pub. Date: Oct. 11, 2012

(65) Prior Publication Data
US 2013/0324662 A1  Dec. 5, 2013

(30) Foreign Application Priority Data

Apr. 8, 2011  (JP) ................. 2011-086300

(51) Int. Cl.
*C08G 14/06* (2006.01)
*C09D 161/00* (2006.01)
*C09D 179/04* (2006.01)
*C08G 73/22* (2006.01)
*H01B 3/30* (2006.01)

(52) U.S. Cl.
CPC ............ *C09D 161/00* (2013.01); *C08G 73/22* (2013.01); *C09D 179/04* (2013.01); *H01B 3/307* (2013.01)

(58) Field of Classification Search
CPC ..... C09D 179/00; C09D 179/04; C08G 73/22
USPC ......................................... 524/595
See application file for complete search history.

(56) References Cited

U.S. PATENT DOCUMENTS

| 3,435,002 | A | * | 3/1969 | Holub | ................ | C07D 307/89 156/329 |
|---|---|---|---|---|---|---|
| 2003/0143480 | A1 | | 7/2003 | Ueda et al. | | |
| 2004/0029045 | A1 | * | 2/2004 | Nunomura | ............ | G03F 7/0233 430/283.1 |
| 2007/0212899 | A1 | * | 9/2007 | Yamanaka | ............ | G03F 7/0233 438/759 |
| 2009/0015760 | A1 | * | 1/2009 | Hattori | ................ | H01L 27/1266 349/93 |
| 2009/0141425 | A1 | | 6/2009 | Dueber et al. | | |
| 2010/0227126 | A1 | * | 9/2010 | Nakano | ................ | G03F 7/0233 428/195.1 |
| 2011/0009506 | A1 | * | 1/2011 | Lee | .................... | B01D 53/228 521/27 |
| 2011/0306687 | A1 | | 12/2011 | Lee et al. | | |
| 2015/0337084 | A1 | * | 11/2015 | Noda | .................... | C08G 73/22 528/336 |

FOREIGN PATENT DOCUMENTS

| JP | 42-023912 | 11/1967 |
|---|---|---|
| JP | 43-002475 | 1/1968 |
| JP | 47-1223 | 1/1972 |
| JP | 64-040530 | 2/1989 |
| JP | 04-202528 | 7/1992 |
| JP | 2004-119080 | 4/2004 |
| JP | 2009-13378 | 1/2009 |
| JP | 2009-161736 | 7/2009 |
| JP | 4456401 | 2/2010 |
| WO | 2009/113747 | 9/2009 |

OTHER PUBLICATIONS

"The Chemical Society of Japan", Maruzen Co. Ltd., May 6, 1992, pp. 332-336.
A.Y. Yakubovich et al., "General polycondensation synthesis of high-molecular-weight liner poly (perfluroalkylenes) with aromatic and hereroaromatic rings in the chain, Vysokomolekulyarnye Soedineniya, SeriaA", 1970, vol. 12, No. 11, pp. 2520-2531.
A.Y Yakubovich et al., "General polycondensation synthesis of high-molecular-weight liner poly(perfluroalkylenes) with aromatic and heteroaromatic rings in the chain, Vysokomolekulyarnye Soedineniya, Seriya A"1970, pp. 2520-2531, vol. 12, No. 11.
, "Experimental Chemistry Lecture, 4th Edition; vol. 28; Synthesis of Polymers", The Chemical Society of Japan, published by Maruzen Co., Ltd., May 6, 1992, pp. 332-336.
International Search Report mailed Jul. 10, 2012 in PCT/JP2012/059242.
Search report from E.P.O. in EP 12 768 274.8, mail date is Oct. 2, 2014.

* cited by examiner

Primary Examiner — Jane L Stanley
(74) Attorney, Agent, or Firm — Greenblum & Bernstein, P.L.C.

(57) ABSTRACT

The present invention provides a polybenzoxazole resin containing a repeating unit represented by the following general formula (1):

$$\left\{\begin{array}{c}N\\\diagup\\O\end{array}\right.\!\!R_1\!\!\left.\begin{array}{c}N\\\diagdown\\O\end{array}\right\}\!\!-\!\!\left\langle\phantom{x}\right\rangle\!\!-\!\!R_2\!\!-\!\!\left\langle\phantom{x}\right\rangle\!\!\right\}_n \quad (1)$$

wherein $R_1$ is a tetravalent aromatic group; N atoms and O atoms which are bonded to $R_1$ are present in the form of pairs each consisting of an N atom and an O atom such that the N atom and the O atom in each pair are respectively bonded to adjacent two carbon atoms constituting the same aromatic ring in $R_1$; $R_2$ is an alkanediyl group having 1 to 6 carbon atoms; and n is an integer of 2 to 10000, which is excellent in electrical insulating properties, heat resistance, mechanical properties, physical properties, dimensional stability and the like, as well as a polybenzoxazole precursor capable of producing the polybenzoxazole resin which is excellent in solubility in solvents and storage stability.

10 Claims, No Drawings

POLYBENZOXAZOLE RESIN AND PRECURSOR THEREOF

TECHNICAL FIELD

The present invention relates to a polybenzoxazole resin that is excellent in electrical insulating properties, heat resistance, mechanical properties, physical properties, dimensional stability and the like, and a polybenzoxazole precursor capable of forming the polybenzoxazole resin which is excellent in solubility in solvents and storage stability.

BACKGROUND ART

The polybenzoxazole is a super-engineering plastic that is very excellent in heat resistance, mechanical strength, dimensional stability, insulating properties and the like, and has been extensively used in the applications of electric and electronic equipments such as printed wiring boards and circuit boards.

The polybenzoxazole is obtained by condensation of an aromatic dicarboxylic acid compound and a bis(o-aminophenol)-based compound. However, the reactant in the form of a carboxylic acid has a low reactivity with phenol or amine, and therefore various studies on a polymerization method therefor have been conventionally made. As to the polymerization method, for example, Non-Patent Document 1 discloses a method of subjecting a bis(o-aminophenol)-based compound and a dicarboxylic acid to condensation reaction in the presence of a polyphosphoric acid. In this method, the polyphosphoric acid acts as both a condensing agent and a solvent. Although the method can be readily performed in a laboratory scale, a large amount of phosphoric acid produced as a by-product will pose a significant problem concerning treatment thereof when practiced in an industrial scale.

Also, in the reaction between a dicarboxylic acid chloride as an activated form of a carboxylic acid and the bis(o-aminophenol)-based compound, there is only a less difference in reactivity between an amino group and a phenolic OH group, so that there tends to arise such a problem that the resulting polymer is insolubilized owing to formation of a crosslinking structure therein. To solve the above problem, there is known the method in which the bis(o-aminophenol)-based compound is subjected to trimethylsilylation reaction and then to the polymerization reaction. According to the above method, it is possible to selectively form an amido bond and thereby obtain a high-molecular weight compound of polyhydroxyamide as a precursor of the polybenzoxazole. The precursor can be treated at a temperature as high as about 250° C. to obtain the polybenzoxazole. However, since the dicarboxylic acid chloride is used in the method, it is necessary to remove a halogen-containing salt from the resulting product, which results in need of too much labor for purification treatment thereof.

To solve the above problems, for example, Patent Document 1 discloses a method for producing polybenzoxazole which is characterized by reacting a bis(o-aminophenol)-based compound with an aromatic dialdehyde. According to the method, it is possible to produce the polybenzoxazole without need of subjecting the obtained product to any particular purification treatment. However, a precursor of the polybenzoxazole produced by the above method tends to have a poor solubility in solvents, and therefore it will be difficult to obtain a uniform solution of the precursor. As a result, in the above method, there tend to arise disadvantages such as deteriorated film-forming property of the obtained polybenzoxazole and poor strength and brittleness of a molded article produced therefrom.

To solve the above problems, for example, Patent Documents 2 and 3 have proposed a specific structure of the above polybenzoxazole precursor which inhibits the precursor from undergoing a ring closing reaction in order to improve a solubility of the polybenzoxazole precursor. However, such a specific structure of the polybenzoxazole precursor which is free from a ring closing reaction by itself tends to be unstable and therefore tends to be deteriorated in storage stability. In addition, the polybenzoxazole precursor tends to be still deteriorated in solubility in solvents owing to a rigid structure on a dialdehyde side thereof, so that there tend to arise disadvantages such as difficulty in forming a uniform solution of the precursor, deterioration in film-forming property of the obtained polybenzoxazole, and poor strength and brittleness of a molded article produced therefrom.

PRIOR ART DOCUMENTS

Patent Documents

Patent Document 1: JP 47-1223B
Patent Document 2: JP 4456401C
Patent Document 3: JP 2009-13378A

Non-Patent Document

Non-Patent Document 1: "Experimental Chemistry Lecture, 4th Edition; Vol. 28; Synthesis of Polymers" edited by The Chemical Society of Japan, published by Maruzen Co., Ltd., on May 6, 1992, p. 332-336

SUMMARY OF THE INVENTION

Problem to be Solved by the Invention

The present invention relates to a polybenzoxazole resin that is excellent in electrical insulating properties, heat resistance, mechanical properties, physical properties, dimensional stability and the like, and a precursor thereof, and more particularly, an object of the present invention is to provide a polybenzoxazole resin that is useful as an interlayer dielectric film for semiconductors, a protective film, an interlayer dielectric film for multilayer circuits, a cover coat for flexible copper-clad plates, a solder resist film, a liquid crystal orientation film and the like, and a polybenzoxazole precursor capable of producing the polybenzoxazole resin which is excellent in solubility in solvents and storage stability.

Means for Solving the Problem

As a result of extensive and intensive researches for achieving the above object, the inventors have found that a specific polybenzoxazole precursor is excellent in solubility in solvents and storage stability, and a polybenzoxazole resin having a specific structure which is produced from the above polybenzoxazole precursor is excellent in electrical insulating properties, heat resistance, mechanical properties, physical properties, dimensional stability and the like, and therefore useful, in particular, as an interlayer dielectric film for semiconductors, a protective film, an interlayer dielectric film for multilayer circuits, a cover coat for flexible copper-clad plates, a solder resist film, a liquid crystal orientation film and the like. The present invention has been accomplished on the basis of the above finding.

That is, the present invention relates to the following aspects.

1. A polybenzoxazole resin containing a repeating unit represented by the following general formula (1):

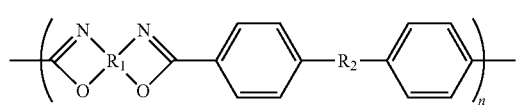

(1)

wherein $R_1$ is a tetravalent aromatic group; N atoms and O atoms which are bonded to $R_1$ are present in the form of pairs each consisting of an N atom and an O atom such that the N atom and the O atom in each pair are respectively bonded to adjacent two carbon atoms constituting the same aromatic ring in $R_1$; $R_2$ is an alkanediyl group having 1 to 6 carbon atoms; and n is an integer of 2 to 10000.

2. A polybenzoxazole precursor containing a repeating unit represented by the following general formula (2):

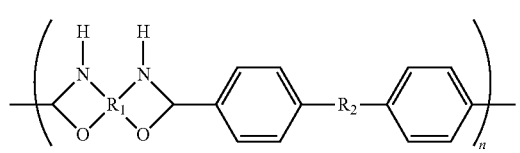

(2)

wherein $R_1$, $R_2$ and n are respectively the same as those described above.

3. A process for producing the polybenzoxazole precursor as described in the above aspect 2, including the step of reacting a compound represented by the following general formula (3) with a dialdehyde compound represented by the following general formula (4):

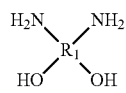

(3)

wherein $R_1$ is a tetravalent aromatic group; and $NH_2$ groups and OH groups which are bonded to $R_1$ are present in the form of pairs each consisting of an $NH_2$ group and an OH group such that the $NH_2$ group and the OH group in each pair are respectively bonded to adjacent two carbon atoms constituting the same aromatic ring in $R_1$; and

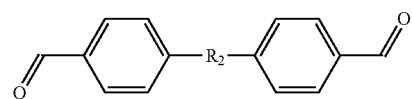

(4)

wherein $R_2$ is the same as described above.

4. A polybenzoxazole precursor containing a repeating unit represented by the following general formula (5):

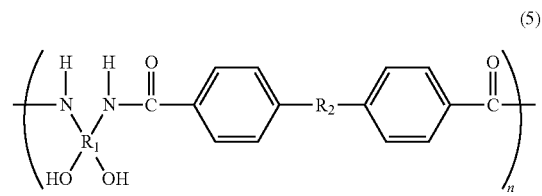

(5)

wherein $R_1$ is a tetravalent aromatic group; N atoms and OH groups which are bonded to $R_1$ are present in the form of pairs each consisting of an N atom and an OH group such that the N atom and the OH group in each pair are respectively bonded to adjacent two carbon atoms constituting the same aromatic ring in $R_1$; $R_2$ is an alkanediyl group having 1 to 6 carbon atoms; and n is an integer of 2 to 10000.

5. A process for producing the polybenzoxazole precursor as described in the above aspect 4, including the step of reacting the compound represented by the above general formula (3) with a compound represented by the following general formula (6):

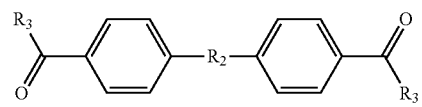

(6)

wherein $R_2$ is the same as described above; $R_3$ is any of OH, Cl, Br, I and $OR_4$; and $R_4$ is a hydrocarbon group having 3 or less carbon atoms.

The present invention further relates to a resin film including the polybenzoxazole resin as described in the above aspect 1, and a coating composition including the polybenzoxazole precursor as described in the above aspect 2 or 4.

Effect of the Invention

The polybenzoxazole precursor according to the present invention exhibits a good solubility in solvents and an excellent storage stability, and therefore can be suitably used for producing a polybenzoxazole resin film that is useful, in particular, as an interlayer dielectric film for semiconductors, a protective film, an interlayer dielectric film for multilayer circuits, a cover coat for flexible copper-clad plates, a solder resist film, a liquid crystal orientation film and the like.

PREFERRED EMBODIMENTS FOR CARRYING OUT THE INVENTION

[Polybenzoxazole Resin]

The polybenzoxazole resin according to the present invention contains a repeating unit represented by the following general formula (1);

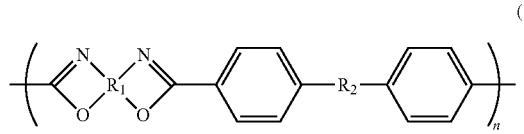

(1)

wherein $R_1$ is a tetravalent aromatic group; N atoms and O atoms which are bonded to $R_1$ are present in the form of pairs each consisting of an N atom and an O atom such that the N atom and the O atom in each pair are respectively bonded to adjacent two carbon atoms constituting the same aromatic ring in $R_1$; $R_2$ is an alkanediyl group having 1 to 6 carbon atoms; and n is an integer of 2 to 10000.

The above aromatic group may include an aromatic group with a monocyclic or polycyclic aromatic ring which is in the form of a carbocyclic ring or a heterocyclic ring containing at least one hetero atom and preferably from 1 to 3 hetero atoms selected from the group consisting of a nitrogen atom, an oxygen atom and a sulfur atom, and which may occasionally form a condensed ring.

In the above general formula (1), $R_1$ preferably has any of structures represented by the following general formulae (7) to (9) from the viewpoints of electrical insulating properties, heat resistance, mechanical properties, physical properties, dimensional stability and the like of the resulting polybenzoxazole resin.

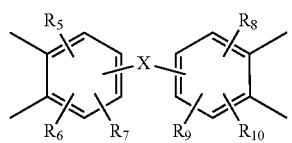

(7)

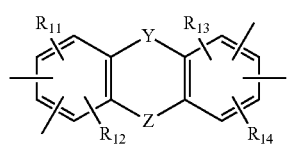

(8)

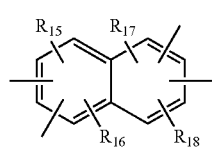

(9)

In the general formulae (7) to (9), X, Y and Z are each independently —$CH_2$—, —O—, —S—, —SO—, —$SO_2$—, —$SO_2NH$—, —CO—, —$CO_2$—, —NHCO—, —NHCONH—, —$C(CF_3)_2$—, —$CF_2$—, —$C(CH_3)_2$—, —$CH(CH_3)$—, —$Si(R_{19})_2$—, —O—$Si(R_{20})_2$—O—, —$Si(R_{21})_2$—O—$Si(R_{22})_2$—, —$(CH_2)_a$—$Si(R_{22})_2$—O—$Si(R_{23})_2$—$(CH_2)_a$— wherein a is an integer of 0 to 6, or a direct bond; and $R_5$ to $R_{23}$ are each independently a hydrogen atom, a fluorine atom, an alkyl group having 1 to 6 carbon atoms, an alkoxyl group having 1 to 6 carbon atoms, or —$(CF_2)_b$—$CF_3$ or —O—$(CF_2)_b$—$CF_3$ wherein b is an integer of 0 to 5.

Among the above structures, $R_1$ more preferably has the structure represented by the above general formula (7). In the general formula (7), it is preferred that $R_5$ to $R_{10}$ all are a hydrogen atom. Also, X is preferably at least one group selected from the group consisting of —$CH_2$—, —O—, —S—, —SO—, —$SO_2$—, —CO—, —$CO_2$—, —NHCO—, —$C(CF_3)_2$—, —$CF_2$—, —$C(CH_3)_2$—, —$CH(CH_3)$— and a direct bond, and more preferably —$C(CF_3)_2$—.

These groups as $R_1$ may be used alone or in combination of any two or more thereof.

Also, in the above general formula (1), $R_2$ is an alkanediyl group having 1 to 6 carbon atoms. From the viewpoints of a good solubility in solvents and the like of the below-mentioned polybenzoxazole precursor, $R_2$ preferably has a structure represented by —$(CH_2)_m$— wherein m is an integer of 2 to 6, preferably 2 to 4 and more preferably 2 or 3.

The above groups as $R_2$ may be used alone or in combination of any two or more thereof.

The polybenzoxazole resin according to the present invention is excellent in electrical insulating properties, heat resistance, mechanical properties, physical properties, dimensional stability and the like.

[Polybenzoxazole Precursor]

The polybenzoxazole precursor according to the present invention contains a repeating unit represented by the following general formula (2):

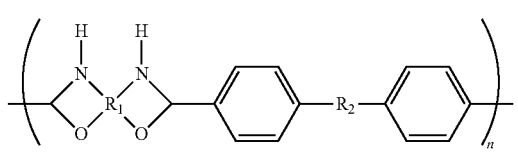

(2)

wherein $R_1$ is a tetravalent aromatic group; N atoms and O atoms which are bonded to $R_1$ are present in the form of pairs each consisting of an N atom and an O atom such that the N atom and the O atom in each pair are respectively bonded to adjacent two carbon atoms constituting the same aromatic ring in $R_1$; $R_2$ is an alkanediyl group having 1 to 6 carbon atoms; and n is an integer of 2 to 10000.

In addition, the polybenzoxazole precursor according to the present invention contains a repeating unit represented by the following general formula (5):

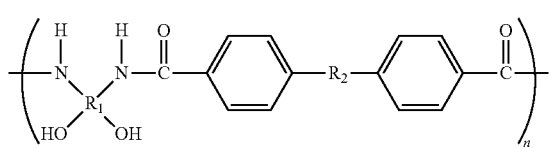

(5)

wherein $R_1$ is a tetravalent aromatic group; N atoms and OH groups which are bonded to $R_1$ are present in the form of pairs each consisting of an N atom and an OH group such that the N atom and the OH group in each pair are respectively bonded to adjacent two carbon atoms constituting the same aromatic ring in $R_1$; $R_2$ is an alkanediyl group having 1 to 6 carbon atoms; and n is an integer of 2 to 10000.

The above aromatic group may include an aromatic group with a monocyclic or polycyclic aromatic ring which is in the form of a carbocyclic ring or a heterocyclic ring containing at least one hetero atom and preferably from 1 to 3 hetero atoms selected from the group consisting of a nitrogen atom, an oxygen atom and a sulfur atom, and which may occasionally form a condensed ring.

In the following, the polybenzoxazole precursor containing the repeating unit represented by the above general formula (2) is referred to merely as a "precursor [1]", whereas the polybenzoxazole precursor containing the repeating unit represented by the above general formula (5) is referred to merely as a "precursor [2]".

Meanwhile, in the precursors [1] and [2], the preferred $R_1$ and $R_2$ are respectively the same as the preferred $R_1$ and $R_2$ of the above polybenzoxazole resin.

(Process for Producing Polybenzoxazole Precursor [1])

The above polybenzoxazole precursor [1] is preferably obtained by reacting a compound represented by the following general formula (3) (hereinafter referred to merely as a "compound (A)") with a compound represented by the following general formula (4). In the following, the preferred process for producing the polybenzoxazole precursor [1] is described.

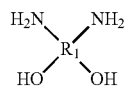
(3)

wherein $R_1$ is a tetravalent aromatic group; and $NH_2$ groups and OH groups which are bonded to $R_1$ are present in the form of pairs each consisting of an $NH_2$ group and an OH group such that the $NH_2$ group and the OH group in each pair are respectively bonded to adjacent two carbon atoms constituting the same aromatic ring in $R_1$; and

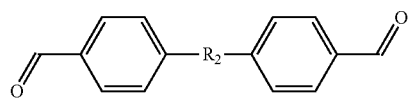
(4)

wherein $R_2$ is an alkanediyl group having 1 to 6 carbon atoms.

<Compound (A)>

The compound (A) used as a starting material upon production of the polybenzoxazole precursor [1] according to the present invention is a compound represented by the following general formula (3).

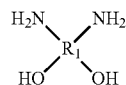
(3)

wherein $R_1$ is a tetravalent aromatic group; and $NH_2$ groups and OH groups which are bonded to $R_1$ are present in the form of pairs each consisting of an $NH_2$ group and an OH group such that the $NH_2$ group and the OH group in each pair are respectively bonded to adjacent two carbon atoms constituting the same aromatic ring in $R_1$.

The above aromatic group may include an aromatic group with a monocyclic or polycyclic aromatic ring which is in the form of a carbocyclic ring or a heterocyclic ring containing at least one hetero atom and preferably from 1 to 3 hetero atoms selected from the group consisting of a nitrogen atom, an oxygen atom and a sulfur atom, and which may occasionally form a condensed ring.

In the above general formula (3), the preferred $R_1$ is the same as the preferred $R_1$ of the above polybenzoxazole resin.

Specific examples of the compound represented by the above general formula (3) are as follows. However, these examples are only illustrative and not intended to limit the present invention thereto.

Specific examples of the compound represented by the general formula (3) include 2,4-diamino-1,5-benzenediol, 2,5-diamino-1,4-benzenediol, 2,5-diamino-3-fluoro-1,4-benzenediol, 2,5-diamino-3,6-difluoro-1,4-benzenediol, 2,5-diamino-3,6-difluoro-1,4-benzenediol, 2,6-diamino-1,5-dihydroxynaphthalene, 1,5-diamino-2,6-dihydroxynaphthalene, 2,6-diamino-3,7-dihydroxynaphthalene, 1,6-diamino-2,5-dihydroxynaphthalene, 4,4'-diamino-3,3'-dihydroxybiphenyl, 3,3'-diamino-4,4'-dihydroxybiphenyl, 2,3'-diamino-3,2'-dihydroxybiphenyl, 3,4'-diamino-4,3'-dihydroxybiphenyl, 4,4'-diamino-3,3'-dihydroxy-6,6'-ditrifluoromethylbiphenyl, 3,3'-diamino-4,4'-dihydroxy-6,6'-ditrifluoromethylbiphenyl, 2,3'-diamino-3,2'-dihydroxy-6,6'-ditrifluoromethylbiphenyl, 3,4'-diamino-4,3'-dihydroxy-6,6'-ditrifluoromethylbiphenyl, 4,4'-diamino-3,3'-dihydroxy-5,5'-ditrifluoromethylbiphenyl, 3,3'-diamino-4,4'-dihydroxy-5,5'-ditrifluoromethylbiphenyl, 2,3'-diamino-3,2'-dihydroxy-5,5'-ditrifluoromethylbiphenyl, 3,4'-diamino-4,3'-dihydroxy-5,5'-ditrifluoromethylbiphenyl, bis(4-amino-3-hydroxyphenyl)methane, bis(3-amino-4-hydroxyphenyl)methane, 3,4'-diamino-4,3'-dihydroxydiphenylmethane, bis(4-amino-3-hydroxy-6-trifluoromethylphenyl)methane, bis(3-amino-4-hydroxy-6-trifluoromethylphenyl)methane, 3,4'-diamino-4,3'-dihydroxy-6,6'-ditrifluoromethyldiphenylmethane, bis(4-amino-3-hydroxyphenyl)difluoromethane, bis(3-amino-4-hydroxyphenyl)difluoromethane, 3,4'-diamino-4,3'-dihydroxydiphenyldifluoromethane, bis(4-amino-3-hydroxy-6-trifluoromethylphenyl)difluoromethane, bis(3-amino-4-hydroxy-6-trifluoromethylphenyl)difluoromethane, 3,4'-diamino-4,3'-dihydroxy-6,6'-ditrifluoromethyldiphenyldifluoromethane, bis(4-amino-3-hydroxyphenyl)ether, bis(3-amino-4-hydroxyphenyl)ether, 3,4'-diamino-4,3'-dihydroxydiphenyl ether, bis(4-amino-3-hydroxy-6-trifluoromethylphenyl)ether, bis(3-amino-4-hydroxy-6-trifluoromethylphenyl)ether, 3,4'-diamino-4,3'-dihydroxy-6,6'-ditrifluoromethyldiphenyl ether, bis(4-amino-3-hydroxyphenyl)ketone, bis(3-amino-4-hydroxyphenyl)ketone, 3,4'-diamino-4,3'-dihydroxydiphenyl ketone, bis(4-amino-3-hydroxy-6-trifluoromethylphenyl)ketone, bis(3-amino-4-hydroxy-6-trifluoromethylphenyl)ketone, 3,4'-diamino-4,3'-dihydroxy-6,6'-ditrifluoromethyldiphenyl ketone, 2,2-bis(3-amino-4-hydroxyphenyl)propane, 2,2-bis(4-amino-3-hydroxyphenyl)propane, 2,2-(3,4'-diamino-4,3'-dihydroxydiphenyl)propane, 2,2-bis(3-amino-4-hydroxy-6-trifluoromethylphenyl)propane, 2,2-bis(4-amino-3-hydroxy-6-trifluoromethylphenyl)propane, 2,2-(3,4'-diamino-4,3'-dihydroxy-6,6'-ditrifluoromethyldiphenyl)propane, 2,2-bis(3-amino-4-hydroxyphenyl)hexafluoropropane, 2,2-bis(4-amino-3-hydroxyphenyl)hexafluoropropane, 2,2-(3,4'-diamino-4,3'-dihydroxydiphenyl)hexafluoropropane, 2,2-bis(3-amino-4-hydroxy-6-trifluoromethylphenyl)hexafluoropropane, 2,2-bis(3-amino-4-hydroxy-6-trifluoromethylphenyl)hexafluoropropane, 2,2-(3,4'-diamino-4,3'-dihydroxy-6,6'-ditrifluoromethyldiphenyl)hexafluoropropane, bis(4-amino-3-hydroxyphenyl)sulfone, bis(3-amino-4-hydroxyphenyl)sulfone, 3,4'-diamino-4,3'-dihydroxydiphenyl sulfone, bis(4-amino-3-hydroxyphenyl)sulfide, 4-amino-3-hydroxyphenyl 4-amino-3-hydroxybenzoate, 4-amino-3-hydroxyphenyl 4-amino-3-hydroxybenzoate, N-(4-amino-3-hydroxyphenyl) 4-amino-3-hydroxybenzanilide, bis(4-amino-3-hydroxyphenyl)dimethylsilane, bis(3-amino-4-hydroxyphenyl)dimethylsilane, 3,4'-diamino-4,3'-dihydroxydiphenyl ether, bis(4-amino-3-hydroxyphenyl)tetramethyldisiloxane, bis(3-amino-4-hydroxyphenyl)tetramethyldisiloxane, 2,4'-bis(4-amino-3-hydroxyphenoxy)biphenyl, 2,4'-bis(3-amino-4-hydroxyphenoxy)biphenyl, 4,4'-bis(3-amino-4-hydroxyphenoxy)biphenyl, 2,4'-bis(3-amino-4-hydroxyphenoxy)biphenyl, 2,4'-bis[4-(4-amino-3-hydroxyphenoxy)phenyl]ether, 2,4'-bis(3-amino-4-hydroxyphenoxy)biphenyl, 4,4'-bis[4-(4-amino-3-hydroxyphenoxy)phenyl]ether, 2,4'-bis[4-(3-amino-4-hydroxyphenoxy)phenyl]ether, 2,4'-bis[4-(3-amino-4-hydroxyphenoxy)phenyl]ether, 4,4'-bis(4-amino-3-hydroxyphenoxy)benzophenone, 4,4'-bis(4-amino-3-hydroxyphenoxy)benzophenone, 4,4'-bis(3-amino-4-hydroxyphenoxy)benzophenone, 2,4'-bis(3-amino-4-hydroxyphenoxy)benzophenone, 2,2-bis(3-amino-4-hydroxy-5-trifluoromethylphenyl)propane, 2,4'-bis(4-amino-3-hydroxyphenoxy)octafluorobiphenyl, 2,4'-bis(3-amino-4-hydroxyphenoxy)octafluorobiphenyl, 4,4'-bis(3-amino-4-hydroxyphenoxy)octafluorobiphenyl, 2,4'-bis(3-amino-4-hydroxyphenoxy)octafluorobiphenyl, 4,4'-bis(4-amino-3-hydroxyphenoxy)octafluorobenzophenone, 4,4'-bis(4-amino-3-hydroxyphenoxy)octafluorobenzophenone, 4,4'-bis(3-amino-4-hydroxyphenoxy)octafluorobenzophenone, 2,4'-bis(3-amino-4-hydroxyphenoxy)octafluorobenzophenone, 2,2-bis(3-amino-4-hydroxy-5-trifluoromethylphenyl)hexafluoropropane, 2,2-bis[4-(4-amino-3-hydroxyphenoxy)phenyl]propane, 2,2-bis[4-(4-amino-3-hydroxyphenoxy)phenyl]hexafluoropropane, 2,2-bis[4-(3-amino-4-hydroxyphenoxy)phenyl]hexafluoropropane, 2,8-diamino-3,7-dihydroxydibenzofuran, 2,8-diamino-3,7-dihydroxyfluorene, 2,6-diamino-3,7-dihydroxyxanthene, 9,9-bis[4-amino-3-hydroxyphenyl]fluorene, 9,9-bis[3-amino-4-hydroxyphenyl]fluorene and 9,9-bis[3-amino-4-hydroxyphenyl]fluorene.

Among these compounds, especially preferred is 2,2-bis(3-amino-4-hydroxyphenyl)hexafluoropropane.

These compounds may be used alone or in combination of any two or more thereof.

<Compound Represented by General Formula (4)>

In the process for producing the polybenzoxazole precursor [1] according to the present invention, the compound to be reacted with the compound (A) represented by the above general formula (3) is a compound represented by the following general formula (4):

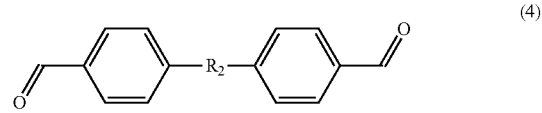

(4)

wherein $R_2$ is an alkanediyl group having 1 to 6 carbon atoms.

In the above general formula (4), $R_2$ is preferably the same as the preferred $R_2$ as described above with respect to the polybenzoxazole resin.

Specific examples of the compound represented by the general formula (4) include diphenylmethane dialdehyde, diphenylethane dialdehyde, 1,3-diphenylpropane dialdehyde, 1,2-diphenylpropane dialdehyde, 1,4-diphenylbutane dialdehyde, 1,3-diphenylbutane dialdehyde, 1,2-diphenylbutane dialdehyde, 2,3-diphenylbutane dialdehyde, 1,5-diphenylpentane dialdehyde, 1,4-diphenylpentane dialdehyde, 1,3-diphenylpentane dialdehyde, 1,2-diphenylpentane dialdehyde, 2,4-diphenylpentane dialdehyde, 2,3-diphenylpentane dialdehyde, 1,6-diphenylhexane dialdehyde, 1,5-diphenylhexane dialdehyde, 1,4-diphenylhexane dialdehyde, 1,3-diphenylhexane dialdehyde, 1,2-diphenylhexane dialdehyde, 2,5-diphenylhexane dialdehyde, 2,4-diphenylhexane dialdehyde, 2,3-diphenylhexane dialdehyde and 2,3-dimethyl-2,3-diphenylbutane dialdehyde. Among these compounds, especially preferred are diphenylethane dialdehyde and 1,3-diphenylpropane dialdehyde.

These compounds may be used alone or in combination of any two or more thereof.

<Reaction between Compound (A) and Compound Represented by General Formula (4)>

In the process for producing the polybenzoxazole precursor [1] according to the present invention, the reaction between the compound (A) and the compound represented by the above general formula (4) is usually carried out in a temperature range of from an ordinary temperature to about 200° C., preferably in a temperature range of from an ordinary temperature to about 160° C., and more preferably further in the presence of a solvent such as toluene having a boiling point of from 100 to 180° C. which is not compatibilizable with water and mixed therein in such an amount that the reactants are not precipitated, while being subjected to dehydration under reflux for about 2 h to about 72 h.

The reaction between the compound (A) and the compound represented by the above general formula (4) is a Schiff base forming reaction, and the reaction per se may be carried out by a conventionally known method. For example, the compound (A) and the compound represented by the above general formula (4) may be reacted with each other in an inert solvent in a temperature range of usually from an ordinary temperature to about 200° C. and preferably from about 100 to about 160° C. for about 2 h to about 72 h. Examples of the inert solvent include amides such as N,N-dimethyl formamide, N,N-dimethyl acetamide and N-methyl-2-pyrrolidone; ketones such as acetone, methyl ethyl ketone, methyl isobutyl ketone, cyclohexanone and isophorone; esters such as γ-butyrolactone, γ-valerolactone, δ-valerolactone, γ-caprolactone, ε-caprolactone, α-methyl-γ-butyrolactone, ethyl lactate, methyl acetate, ethyl acetate and butyl acetate; aliphatic alcohols having 1 to 10 carbon atoms such as methanol, ethanol and propanol; aromatic group-containing phenols such as phenol and cresol; aromatic group-containing alcohols such as benzyl alcohol; glycols such as ethylene glycol and propylene glycol, or glycol ethers such as monoethers or diethers of these glycols with methanol, ethanol, butanol, hexanol, octanol, benzyl alcohol, phenol, cresol, etc., and esters of the monoethers; cyclic ethers such as dioxane and tetrahydrofuran; cyclic carbonates such as ethylene carbonate and propylene carbonate; aliphatic hydrocarbons and aromatic hydrocarbons such as toluene and xylene; and dimethyl sulfoxide. These solvents may be used alone or in the form of a mixture of any two or more thereof according to the requirements.

The compounding ratio between the compound (A) and the compound represented by the above general formula (4) may be controlled such that the compound represented by the above general formula (4) is preferably used in an amount of from 0.5 to 1.5 mol and especially preferably from 0.7 to 1.3 mol per 1 mol of the compound (A).

(Process for Producing Polybenzoxazole Precursor [2])

The polybenzoxazole precursor [2] is preferably obtained by reacting the compound represented by the above general formula (3) (compound (A)) with a compound represented by the following general formula (6). In the following, the preferred process for producing the polybenzoxazole precursor [2] is described.

The details of the compound represented by the above general formula (3) (compound (A)) are the same as those described previously.

<Compound Represented by General Formula (6)>

In the process for producing the polybenzoxazole precursor [2] according to the present invention, the compound to be reacted with the compound (A) represented by the above general formula (3) is a compound represented by the following general formula (6):

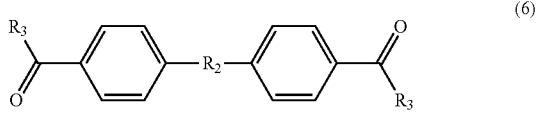

(6)

wherein $R_2$ is an alkanediyl group having 1 to 6 carbon atoms; $R_3$ is any of OH, Cl, Br, I and $OR_4$; and $R_4$ is a hydrocarbon group having 3 or less carbon atoms.

In the above general formula (6), the preferred $R_2$ is the same as the preferred $R_2$ as described above with respect to the polybenzoxazole resin.

Specific examples of the compound represented by the above general formula (6) include dicarboxylic acids such as diphenylmethane dicarboxylic acid, diphenylethane dicarboxylic acid, 1,3-diphenylpropane dicarboxylic acid, 1,2-diphenylpropane dicarboxylic acid, 1,4-diphenylbutane dicarboxylic acid, 1,3-diphenylbutane dicarboxylic acid, 1,2-diphenylbutane dicarboxylic acid, 2,3-diphenylbutane dicarboxylic acid, 1,5-diphenylpentane dicarboxylic acid, 1,4-diphenylpentane dicarboxylic acid, 1,3-diphenylpentane dicarboxylic acid, 1,2-diphenylpentane dicarboxylic acid, 2,4-diphenylpentane dicarboxylic acid, 2,3-diphenylpentane dicarboxylic acid, 1,6-diphenylhexane dicarboxylic acid, 1,5-diphenylhexane dicarboxylic acid, 1,4-diphenylhexane dicarboxylic acid, 1,3-diphenylhexane dicarboxylic acid, 1,2-diphenylhexane dicarboxylic acid, 2,5-diphenylhexane dicarboxylic acid, 2,4-diphenylhexane dicarboxylic acid, 2,3-diphenylhexane dicarboxylic acid and 2,3-dimethyl-2,3-diphenylbutane dicarboxylic acid;

alkyl dicarboxylates (in which an alkyl group contained therein is any of methyl, ethyl, 1-propyl and 2-propyl) such as alkyl diphenylmethane dicarboxylates, alkyl diphenylethane dicarboxylates, alkyl 1,3-diphenylpropane dicarboxylates, alkyl 1,2-diphenylpropane dicarboxylates, alkyl 1,4-diphenylbutane dicarboxylates, alkyl 1,3-diphenylbutane dicarboxylates, alkyl 1,2-diphenylbutane dicarboxylates, alkyl 2,3-diphenylbutane dicarboxylates, alkyl 1,5-diphenylpentane dicarboxylates, alkyl 1,4-diphenylpentane dicarboxylates, alkyl 1,3-diphenylpentane dicarboxylates, alkyl 1,2-diphenylpentane dicarboxylates, alkyl 2,4-diphenylpentane dicarboxylates, alkyl 2,3-diphenylpentane dicarboxylates, alkyl 1,6-diphenylhexane dicarboxylates-, alkyl 1,5-diphenylhexane dicarboxylates, alkyl 1,4-diphenylhexane dicarboxylates, alkyl 1,3-diphenylhexane dicarboxylates, alkyl 1,2-diphenylhexane dicarboxylates, alkyl 2,5-diphenylhexane dicarboxylates, alkyl 2,4-diphenylhexane dicarboxylates, alkyl 2,3-diphenylhexane dicarboxylates and alkyl 2,3-dimethyl-2,3-diphenylbutane dicarboxylates;

dicarboxylic acid chlorides such as diphenylmethane dicarboxylic acid chloride, diphenylethane dicarboxylic acid chloride, 1,3-diphenylpropane dicarboxylic acid chloride, 1,2-diphenylpropane dicarboxylic acid chloride, 1,4-diphenylbutane dicarboxylic acid chloride, 1,3-diphenylbutane dicarboxylic acid chloride, 1,2-diphenylbutane dicarboxylic acid chloride, 2,3-diphenylbutane dicarboxylic acid chloride, 1,5-diphenylpentane dicarboxylic acid chloride, 1,4-diphenylpentane dicarboxylic acid chloride, 1,3-diphenylpentane dicarboxylic acid chloride, 1,2-diphenylpentane dicarboxylic acid chloride, 2,4-diphenylpentane dicarboxylic acid chloride, 2,3-diphenylpentane dicarboxylic acid chloride, 1,6-diphenylhexane dicarboxylic acid chloride, 1,5-diphenylhexane dicarboxylic acid chloride, 1,4-diphenylhexane dicarboxylic acid chloride, 1,3-diphenylhexane dicarboxylic acid chloride, 1,2-diphenylhexane dicarboxylic acid chloride, 2,5-diphenylhexane dicarboxylic acid chloride, 2,4-diphenylhexane dicarboxylic acid chloride, 2,3- diphenylhexane dicarboxylic acid chloride and 2,3-dimethyl-2,3-diphenylbutane dicarboxylic acid chloride;
dicarboxylic acid bromides such as diphenylmethane dicarboxylic acid bromide, diphenylethane dicarboxylic acid bromide, 1,3-diphenylpropane dicarboxylic acid bromide, 1,2-diphenylpropane dicarboxylic acid bromide, 1,4-diphenylbutane dicarboxylic acid bromide, 1,3-diphenylbutane dicarboxylic acid bromide, 1,2-diphenylbutane dicarboxylic acid bromide, 2,3-diphenylbutane dicarboxylic acid bromide, 1,5-diphenylpentane dicarboxylic acid bromide, 1,4-diphenylpentane dicarboxylic acid bromide, 1,3-diphenylpentane dicarboxylic acid bromide, 1,2-diphenylpentane dicarboxylic acid bromide; 2,4-diphenylpentane dicarboxylic acid bromide, 2,3-diphenylpentane dicarboxylic acid bromide, 1,6-diphenylhexane dicarboxylic acid bromide, 1,5-diphenylhexane dicarboxylic acid bromide, 1,4-diphenylhexane dicarboxylic acid bromide, 1,3-diphenylhexane dicarboxylic acid bromide, 1,2-diphenylhexane dicarboxylic acid bromide, 2,5-diphenylhexane dicarboxylic acid bromide, 2,4-diphenylhexane dicarboxylic acid bromide, 2,3-diphenylhexane dicarboxylic acid bromide and 2,3-dimethyl-2,3-diphenylbutane dicarboxylic acid bromide; and
dicarboxylic acid iodides such as diphenylmethane dicarboxylic acid iodide, diphenylethane dicarboxylic acid iodide, 1,3-diphenylpropane dicarboxylic acid iodide, 1,2-diphenylpropane dicarboxylic acid iodide, 1,4-diphenylbutane dicarboxylic acid iodide, 1,3-diphenylbutane dicarboxylic acid iodide, 1,2-diphenylbutane dicarboxylic acid iodide, 2,3-diphenylbutane dicarboxylic acid iodide, 1,5-diphenylpentane dicarboxylic acid iodide, 1,4-diphenylpentane dicarboxylic acid iodide, 1,3-diphenylpentane dicarboxylic acid iodide, 1,2-diphenylpentane dicarboxylic acid iodide, 2,4-diphenylpentane dicarboxylic acid iodide, 2,3-diphenylpentane dicarboxylic acid iodide, 1,6-diphenylhexane dicarboxylic acid iodide, 1,5-diphenylhexane dicarboxylic acid iodide, 1,4-diphenylhexane dicarboxylic acid iodide, 1,3-diphenylhexane dicarboxylic acid iodide, 1,2-diphenylhexane dicarboxylic acid iodide, 2,5-diphenylhexane dicarboxylic acid iodide, 2,4-diphenylhexane dicarboxylic acid iodide, 2,3-diphenylhexane dicarboxylic acid iodide and 2,3-dimethyl-2,3-diphenylbutane dicarboxylic acid iodide. Among these compounds, preferred are diphenylethane dicarboxylic acid derivatives and 1,3-diphenylpropane dicarboxylic acid derivatives, and more preferred are diphenylethane dicarboxylic acid chloride and 1,3-diphenylpropane dicarboxylic acid chloride.

These compounds may be used alone or in combination of any two or more thereof.

<Reaction Between Compound (A) and Compound Represented by General Formula (6)>

The reaction between the compound (A) and the compound represented by the above general formula (6) in which the compound represented by the above general formula (6) is a dicarboxylic acid or a dicarboxylic acid ester is usually carried out in a temperature range of from an ordinary temperature to about 200° C., preferably in a temperature range of from an ordinary temperature to about 160° C., and more preferably further in the presence of a solvent such as toluene having a boiling point of from 100 to 180° C. which is not compatibilizable with water and mixed therein in such an amount that the reactants are not precipitated, while being subjected to dehydration under reflux or while being subjected to dealcoholization under reflux for about 2 h to about 72 h.

Also, the reaction between the compound (A) and the compound represented by the above general formula (6) in which the compound represented by the above general formula (6) is a dicarboxylic acid halide is usually carried out at a temperature of from about −20° C. to about 150° C., preferably from about −10° C. to about 100° C. and more preferably from about −5° C. to 70° C. In addition, for the purpose of neutralizing a hydrogen halide generated by the reaction, after adding a tertiary amine such as triethylamine, pyridine and N,N-dimethyl-4-aminopyridine or an alkali hydroxide to the reaction system, the reaction may be carried out for about 2 h to about 72 h.

The reaction between the compound (A) and the compound represented by the above general formula (6) is an amide group forming reaction, and the reaction per se may be carried out by a conventionally known method.

For example, the compound (A) and the compound represented by the above general formula (6) may be reacted with each other in an inert solvent in the above temperature range for about 2 h to about 72 h. Examples of the inert solvent include amides such as N,N-dimethyl formamide, N,N-dimethyl acetamide and N-methyl-2-pyrrolidone; ketones such as acetone, methyl ethyl ketone, methyl isobutyl ketone, cyclohexanone and isophorone; esters such as γ-butyrolactone, γ-valerolactone, δ-valerolactone, γ-caprolactone, ε-caprolactone, α-methyl-γ-butyrolactone, ethyl lactate, methyl acetate, ethyl acetate and butyl acetate; aliphatic alcohols having 1 to 10 carbon atoms such as methanol, ethanol and propanol; aromatic group-containing phenols such as phenol and cresol; aromatic group-containing alcohols such as benzyl alcohol; glycols such as ethylene glycol and propylene glycol, or glycol ethers such as monoethers or diethers of these glycols with methanol, ethanol, butanol, hexanol, octanol, benzyl alcohol, phenol, cresol, etc., or esters of the monoethers; cyclic ethers such as dioxane and tetrahydrofuran; cyclic carbonates such as ethylene carbonate and propylene carbonate; aliphatic hydrocarbons and aromatic hydrocarbons such as toluene and xylene; and dimethyl sulfoxide. These solvents may be used alone or in the form of a mixture of any two or more thereof according to the requirements.

The compounding ratio between the compound (A) and the compound represented by the above general formula (6) may be controlled such that the compound represented by the above general formula (6) is preferably used in an amount of from 0.5 to 1.5 mol and especially preferably from 0.7 to 1.3 mol per 1 mol of the compound (A).

When subjecting the thus produced polybenzoxazole precursors [1] and [2] according to the present invention to heat oxidation, it is possible to produce the polybenzoxazole resin containing the repeating unit represented by the above general formula (2) which is excellent in electrical insulating properties, heat resistance, mechanical properties, physical properties, dimensional stability and the like.

[Coating Composition and Resin Film]

The present invention also relates to a coating composition containing the polybenzoxazole precursor, and a resin film containing the polybenzoxazole resin.

The polybenzoxazole precursor according to the present invention may also be compounded, if required, with a solvent and/or various additives such as, for example, a surfactant and a coupling agent, thereby producing a coating composition that is useful for forming a film such as an interlayer dielectric film for semiconductors, a protective film, an interlayer dielectric film for multilayer circuits, a cover coat for flexible copper-clad plates, a solder resist film, a liquid crystal orientation film or the like.

The solvent to be compounded with the polybenzoxazole precursor is not particularly limited, and any suitable solvent may be used as long as it is capable of dissolving the polybenzoxazole precursor according to the present invention and the optionally used additives therein. Examples of the solvent include amides such as N,N-dimethyl formamide, N,N-dimethyl acetamide and N-methyl-2-pyrrolidone; ketones such as acetone, methyl ethyl ketone, methyl isobutyl ketone, cyclohexanone and isophorone; esters such as γ-butyrolactone, γ-valerolactone, δ-valerolactone, γ-caprolactone, ε-caprolactone, α-methyl-γ-butyrolactone, ethyl lactate, methyl acetate, ethyl acetate and butyl acetate; aliphatic alcohols having 1 to 10 carbon atoms such as methanol, ethanol and propanol; aromatic group-containing phenols such as phenol and cresol; aromatic group-containing alcohols such as benzyl alcohol; glycols such as ethylene glycol and propylene glycol, or glycol ethers such as monoethers or diethers of these glycols with methanol, ethanol, butanol, hexanol, octanol, benzyl alcohol, phenol, cresol, etc., or esters of the monoethers; cyclic ethers such as dioxane and tetrahydrofuran; cyclic carbonates such as ethylene carbonate and propylene carbonate; aliphatic and aromatic hydrocarbons; and dimethyl sulfoxide. These solvents may be used alone or in the form of a mixture of any two or more thereof according to the requirements.

The content of the polybenzoxazole precursor according to the present invention in the coating composition is not strictly limited and may vary depending upon the applications thereof. In general, the content of the polybenzoxazole precursor in the coating composition in terms of a solid content is in the range of from 5 to 80% by mass and especially preferably from 10 to 70% by mass.

The base material to which the coating composition according to the present invention may be applied is not particularly limited. Examples of the base material include semiconductor materials such as silicon wafers and gallium arsenides, metals, metal oxides, ceramics, resins, copper foil-laminated printed circuit boards, glass or the like. The coating composition may be applied onto these base materials by a conventionally known coating method such as, for example, a spin coating method, a spray coating method, a roll coating method, a curtain flow coating method and a printing method.

The coating film thus formed is then subjected to drying and baking. The thickness of the coating film is not strictly limited and may vary according to the use or objects thereof, and is usually in the range of from about 0.1 to about 100 μm and preferably from about 0.5 to about 30 μm in terms of a dry thickness thereof. The thus formed polybenzoxazole precursor coating film may be subjected, if required, to preliminary baking step at a temperature of from 80 to 190° C. for a period of from about 10 s to about 120 min, and then is subjected to substantial baking step at a temperature of from 200 to 500° C. and preferably from 250 to 400° C. for a period of from about 10 min to about 300 min, thereby transforming the coating film into a polybenzoxazole resin film.

EXAMPLES

The present invention will be described in more detail below by referring to the following Examples and Comparative Examples. Meanwhile, in the following, the term "%" represents "% by weight".

The measurements for evaluation of various properties according to the present invention were conducted by the following methods. The results of measurement of a solid content, a number-average molecular weight and a viscosity in Examples 1 to 3 and Comparative Examples 1 to 4 are shown in Table 1, and the results of TG/DTA measurement in Examples 4 to 6 and Comparative Examples 5 and 6 are shown in Table 2.

(1) Number-Average Molecular Weight

The number-average molecular weight was measured and determined by gel permeation chromatography (GPC). The GPC measurement was carried out using "Shodex GPC SYSTEM-11" available from Showa Denko K.K., in which hexafluoroisopropanol (HFIP) was used as a solvent, and 10 mg of polybenzoxazole as a sample were dissolved in 10 g of HFIP and used in the measurement. The measurement of the number-average molecular weight was carried out using two GPC standard columns "HFIP-806M" (column size: 300×8.0 mm I.D.) as measuring columns and two reference columns "HFIP-800" all available from Showa Denko K.K., while setting a temperature of the respective columns to 40° C. and a flow rate of the solvent to 1.0 mL/min. In addition, PMMA was used as a reference standard sample, and a data processing software "SIC-480II" available from Showa Denko K.K., was also used.

(2) Viscosity

The measurement of the viscosity was conducted at 25° C. using "VISCOMETOR BM Model" available from Tokimec Inc.

(3) Weight Loss Temperature

The measurement of the weight loss temperature was conducted in a temperature range of from 0° C. to 800° C. at a temperature rise rate of 10° C./min using a TG/DTA measuring device "DTG-60 Model" available from Shimadzu Corp.

Example 1

Production of Polybenzoxazole Precursor

A 100 mL round bottom flask filled with toluene and equipped with a Dean-Stark water separator and a cooling tube was charged with 14.65 g (40 mmol) of 2,2-bis(3-amino-4-hydroxyphenyl)hexafluoropropane, 9.531 g (40 mmol) of 4,4'-diformyl-1,2-diphenylethane and 20 mL of N,N-dimethyl formamide, and the contents of the flask were subjected to dehydration reaction while being refluxed for 10 h under a nitrogen sealed condition. The resulting reaction solution was subjected to distillation under reduced pressure to remove toluene therefrom, thereby obtaining a polybenzoxazole precursor solution (A1) having a solid content of 54% and a viscosity of 3000 mPa·s. The resulting polybenzoxazole precursor had a number-average molecular weight of about 6,000.

The thus synthesized product was identified as follows. That is, a small amount of the polybenzoxazole precursor solution (A1) was charged into 100 mL of methanol and allowed to precipitate therein, and the resulting precipitate was separated from the solution by filtration through a filter and then dried under reduced pressure to obtain a solid of the polybenzoxazole precursor, followed by subjecting the resulting solid to $^1$H-NMR analysis. As a result, in a chart of the $^1$H-NMR analysis (DMSO-d6), specific elimination of proton at 8.66 ppm peculiar to an imine bond was observed, and specific production of proton at 6.11 ppm peculiar to the structure obtained after ring closing reaction was observed. In consequence, it was confirmed that the polybenzoxazole precursor solution (A1) contained the repeating unit represented by the above general formula (2).

Example 2

Production of Polybenzoxazole Precursor

A 100 mL round bottom flask filled with toluene and equipped with a Dean-Stark water separator and a cooling tube was charged with 14.65 g (40 mmol) of 2,2-bis(3-amino-4-hydroxyphenyl)hexafluoropropane, 10.09 g (40 mmol) of 4,4'-diformyl-1,3-diphenylpropane and 20 mL of N,N-dimethyl formamide, and the contents of the flask were subjected to dehydration reaction while being refluxed for 10 h under a nitrogen sealed condition. The resulting reaction solution was subjected to distillation under reduced pressure to remove toluene therefrom, thereby obtaining a polybenzoxazole precursor solution (A2) having a solid content of 55% and a viscosity of 2000 mPa·s. The resulting polybenzoxazole precursor had a number-average molecular weight of about 7,000.

The thus synthesized product was identified as follows. That is, a small amount of the polybenzoxazole precursor solution (A2) was charged into 100 mL of methanol and allowed to precipitate therein, and the resulting precipitate was separated from the solution by filtration through a filter and then dried under reduced pressure to obtain a solid of the polybenzoxazole precursor, followed by subjecting the resulting solid to $^1$H-NMR analysis. As a result, in a chart of the $^1$H-NMR analysis (DMSO-d6), specific elimination of proton at 8.66 ppm peculiar to an imine bond was observed, and specific production of proton at 6.11 ppm peculiar to the structure obtained after ring closing reaction was observed. In consequence, it was confirmed that the polybenzoxazole precursor solution (A2) contained the repeating unit represented by the above general formula (2).

Example 3

Production of Polybenzoxazole Precursor

A 100 mL round bottom flask having a cooling function was charged with 14.65 g (40 mmol) of 2,2-bis(3-amino-4-hydroxyphenyl)hexafluoropropane, 8.10 g (80 mmol) of triethylamine and 10 mL of N,N-dimethyl formamide, and then a solution prepared by dissolving 12.28 g (40 mmol) of dibenzyl-4,4'-dicarbonyl chloride in 10 mL of N,N-dimethyl formamide was added dropwise to the flask at 0° C. over 30 min under a nitrogen sealed condition. After completion of the dropwise addition, the contents of the flask were cooled to room temperature and further reacted while stirring for 5 h, thereby obtaining a polybenzoxazole precursor solution (A3) having a solid content of 54% and a viscosity of 1000 mPa·s. The resulting polybenzoxazole precursor had a number-average molecular weight of about 6,000.

The thus synthesized product was identified as follows. That is, a small amount of the polybenzoxazole precursor solution (A3) was charged into 100 mL of methanol and allowed to precipitate therein, and the resulting precipitate was separated from the solution by filtration through a filter and then dried under reduced pressure to obtain a solid of the polybenzoxazole precursor, followed by subjecting the resulting solid to measurement of FT-IR spectrum by a KBr method. As a result, in the FT-IR spectrum curve, specific absorption near 1632 cm$^{-1}$ peculiar to an amide bond was observed, and wide absorption derived from an OH group with a peak at 3418 cm$^{-1}$ was observed. In consequence, it was confirmed that the polybenzoxazole precursor solution (A3) contained the repeating unit represented by the above general formula (5).

Example 4

Formation of Thin Film of Polybenzoxazole Resin

The polybenzoxazole precursor solution (A1) obtained in Example 1 was cast over a glass plate to form a thin coating film having a thickness of 50 μm using an applicator. The resulting thin film was subjected to heat treatment on a hot plate at 150° C. Thereafter, the thin film was held on the hot plate at each of hot plate temperatures of 200° C., 250° C. and 300° C. for 1 h. As a result of subjecting the resulting thin film to measurement of FT-IR spectrum, it was confirmed that absorption derived from formation of a benzoxazole ring was observed near 1557 cm$^{-1}$ and near 1574 cm$^{-1}$. Also, in the chart of $^1$H-NMR analysis (DMSO-d6), specific elimination of proton at 6.11 ppm peculiar to a benzyl site adjacent to a hetero atom was observed. In consequence, it was confirmed that a polybenzoxazole resin (B1) in the form of a thin film was produced from the polybenzoxazole precursor solution (A1). As a result of subjecting the resulting polybenzoxazole resin (B1) in the form of a thin film to TG/DTA measurement, it was confirmed that the polybenzoxazole resin (B1) had a 5% weight loss temperature of 556° C. and a 10% weight loss temperature of 595° C. as measured in air.

Example 5

Formation of Thin Film of Polybenzoxazole Resin

The same procedure as in Example 4 was repeated except for using the polybenzoxazole precursor solution (A2) obtained in Example 2, thereby obtaining a polybenzoxazole resin (B2). As a result of subjecting the resulting polybenzoxazole resin (B2) to TG/DTA measurement, it was confirmed that the polybenzoxazole resin (B2) had a 5% weight loss temperature of 540° C. and a 10% weight loss temperature of 573° C. as measured in air.

Example 6

Formation of Thin Film of Polybenzoxazole Resin

The same procedure as in Example 4 was repeated except for using the polybenzoxazole precursor solution (A3) obtained in Example 3, thereby obtaining a polybenzoxazole resin (B3). As a result of subjecting the resulting polybenzoxazole resin (B3) to TG/DTA measurement, it was confirmed that the polybenzoxazole resin (B3) had a 5% weight loss temperature of 555° C. and a 10% weight loss temperature of 596° C. as measured in air.

Comparative Example 1

A 100 mL round bottom flask filled with toluene and equipped with a Dean-Stark water separator and a cooling tube was charged with 14.64 g (40 mmol) of 2,2-bis(3-amino-4-hydroxyphenyl)hexafluoropropane, 5.36 g (40 mmol) of terephthalaldehyde and 20 mL of N,N-dimethyl formamide, and the contents of the flask were refluxed for 5 h under a nitrogen sealed condition, and the obtained solution was subjected to dehydration reaction while being refluxed by distillation under reduced pressure for 10 h. The obtained reaction solution was subjected to distillation under reduced pressure to remove toluene therefrom. However, the resulting polybenzoxazole precursor (C1) failed to form a solution, and was precipitated as a solid. The polybenzoxazole precursor had a number average molecular weight of about 5,000.

The identification of the thus synthesized product was conducted by subjecting the precipitated solid of the polybenzoxazole precursor (C1) to $^1$H-NMR analysis. As a result, in a chart of the $^1$H-NMR analysis (DMSO-d6), specific elimination of proton at 8.66 ppm peculiar to an imine bond was observed, and specific production of proton at 6.11 ppm peculiar to the structure obtained after ring closing reaction was observed.

Comparative Example 2

A 100 mL round bottom flask filled with toluene and equipped with a Dean-Stark water separator and a cooling tube was charged with 14.64 g (40 mmol) of 2,2-bis(3-amino-4-hydroxyphenyl)hexafluoropropane, 5.36 g (40 mmol) of isophthalaldehyde and 20 mL of N,N-dimethyl formamide, and the contents of the flask were refluxed for 5 h under a nitrogen sealed condition, and the obtained solution was subjected to dehydration reaction while being refluxed by distillation under reduced pressure for 10 h. The obtained reaction solution was subjected to distillation under reduced pressure to remove toluene therefrom. However, the resulting polybenzoxazole precursor (C2) failed to form a solution, and was precipitated as a solid. The polybenzoxazole precursor had a number-average molecular weight of about 4,000.

The identification of the thus synthesized product was conducted by subjecting the precipitated solid of the polybenzoxazole precursor (C2) to $^1$H-NMR analysis. As a result, in a chart of the $^1$H-NMR analysis (DMSO-d6), specific elimination of proton at 8.66 ppm peculiar to an imine bond was observed, and specific production of proton at 6.11 ppm peculiar to the structure obtained after ring closing reaction was observed.

Comparative Example 3

A 100 mL round bottom flask having a cooling function was charged with 14.64 g (40 mmol) of 2,2-bis(3-amino-4-hydroxyphenyl)hexafluoropropane, 8.10 g (80 mmol) of triethylamine and 10 mL of N,N-dimethyl formamide, and then a solution prepared by dissolving 8.12 g (40 mmol) of terephthalic acid chloride in 10 mL of N,N-dimethyl formamide was added dropwise to the flask at 0° C. over 30 min under a nitrogen sealed condition. After completion of the dropwise addition, the contents of the flask were cooled to room temperature and further reacted while stirring for 5 h, thereby obtaining a polybenzoxazole precursor solution (C3) having a solid content of 50% and a viscosity of 5000 mPa·s. The resulting polybenzoxazole precursor had a number-average molecular weight of about 5,000.

The thus synthesized product was identified as follows. That is, a small amount of the polybenzoxazole precursor solution (C3) was charged into 100 mL of methanol and allowed to precipitate therein, and the resulting precipitate was separated from the solution by filtration through a filter and then dried under reduced pressure to obtain a solid of the polybenzoxazole precursor, followed by subjecting the resulting solid to measurement of FT-IR spectrum by a KBr method. As a result, in the FT-IR spectrum curve, specific absorption near 1632 cm$^{-1}$ peculiar to an amide bond was observed, and wide absorption derived from an OH group with a peak at 3418 cm$^{-1}$ was observed.

Comparative Example 4

A 100 mL round bottom flask having a cooling function was charged with 14.64 g (40 mmol) of 2,2-bis(3-amino-4-hydroxyphenyl)hexafluoropropane, 8.10 g (80 mmol) of triethylamine and 10 mL of N,N-dimethyl formamide, and then a solution prepared by dissolving 11.80 g (40 mmol) of 4,4'-oxydibenzoyl chloride in 10 mL of N,N-dimethyl formamide was added dropwise to the flask at 0° C. over 30 min under a nitrogen sealed condition. After completion of the dropwise addition, the contents of the flask were cooled to room temperature and further reacted while stirring for 5 h, thereby obtaining a polybenzoxazole precursor solution (C4) having a solid content of 54% and a viscosity of 6000 mPa·s. The resulting polybenzoxazole precursor had a number-average molecular weight of about 6,000.

The thus synthesized product was identified as follows. That is, a small amount of the polybenzoxazole precursor solution (C4) was charged into 100 mL of methanol and allowed to precipitate therein, and the resulting precipitate was separated from the solution by filtration through a filter and then dried under reduced pressure to obtain a solid of the polybenzoxazole precursor, followed by subjecting the resulting solid to measurement of FT-IR spectrum by a KBr method. As a result, in the FT-IR spectrum curve, specific absorption near 1632 cm$^{-1}$ peculiar to an amide bond was observed, and wide absorption derived from an OH group with a peak at 3418 cm$^{-1}$ was observed.

Comparative Example 5

The same procedure as in Example 4 was repeated except for using the polybenzoxazole precursor solution (C3) obtained in Comparative Example 3, thereby obtaining a polybenzoxazole resin (D3). As a result of subjecting the resulting polybenzoxazole resin (D3) to TG/DTA measurement, it was confirmed that the polybenzoxazole resin (D3) had a 5% weight loss temperature of 560° C. and a 10% weight loss temperature of 599° C. as measured in air.

Comparative Example 6

The same procedure as in Example 4 was repeated except for using the polybenzoxazole precursor solution (C4) obtained in Comparative Example 4, thereby obtaining a polybenzoxazole resin (D4). As a result of subjecting the resulting polybenzoxazole resin (D4) to TG/DTA measurement, it was confirmed that the polybenzoxazole resin (D4) had a 5% weight loss temperature of 542° C. and a 10% weight loss temperature of 571° C. as measured in air.

TABLE 1

|  | Examples | | | Comparative Examples | | | |
|---|---|---|---|---|---|---|---|
|  | 1 | 2 | 3 | 1 | 2 | 3 | 4 |
| Solid content of precursor solution (mass %) | 54 | 55 | 54 | *1) | *1) | 50 | 54 |
| Number-average molecular weight | 6,000 | 7,000 | 6,000 | 5,000 | 4,000 | 5,000 | 6,000 |
| Initial viscosity (mPa · s) | 3,000 | 2,000 | 1,000 | — | — | 5,000 | 6,000 |
| Viscosity after 1 month (mPa · s) | 3,000 | 2,000 | 1,000 | — | — | *1) | 100,000 |
| Viscosity after 6 months (mPa · s) | 3,000 | 2,000 | 2,000 | — | — | — | *1) |
| Viscosity after 12 months (mPa · s) | 3,000 | 2,000 | 3,000 | — | — | — | — |

Note
*1): Precipitated as solid.

TABLE 2

|  | Examples | | | Comparative Examples | |
|---|---|---|---|---|---|
|  | 4 | 5 | 6 | 5 | 6 |
| 5% Weight loss temperature (° C.) | 556 | 540 | 555 | 560 | 542 |
| 10% Weight loss temperature (° C.) | 595 | 573 | 596 | 599 | 571 |

INDUSTRIAL APPLICABILITY

The polybenzoxazole precursor according to the present invention is excellent in solubility in solvents and storage stability, and the polybenzoxazole resin produced from the above polybenzoxazole precursor is useful, in particular, as an interlayer dielectric film for semiconductors, a protective film, an interlayer dielectric film for multilayer circuits, a cover coat for flexible copper-clad plates, a solder resist film, a liquid crystal orientation film or the like.

The invention claimed is:

1. A polybenzoxazole resin comprising a repeating unit represented by the following general formula (1):

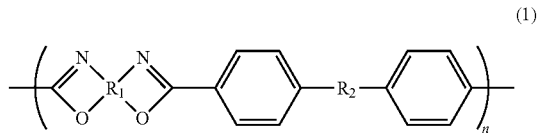

(1)

wherein $R_1$ is a tetravalent aromatic group; N atoms and O atoms which are bonded to $R_1$ are present in the form of pairs each consisting of an N atom and an O atom such that the N atom and the 0 atom in each pair are respectively bonded to adjacent two carbon atoms constituting the same aromatic ring in $R_1$; $R_2$ is an alkanediyl group having 2 to 6 carbon atoms and benzene rings on each side adjacent $R_2$ are distanced from each other by at least 2 carbon atoms of $R_2$; and n is an integer of 2 to 10000.

2. The polybenzoxazole resin according to claim 1, wherein $R_2$ is an alkanediyl group represented by the formula:

$$-(CH_2)_m-$$

wherein m is an integer of 2 to 6.

3. The polybenzoxazole resin according to claim 1, wherein $R_1$ has any of the structures represented by the following general formulae (7) to (9):

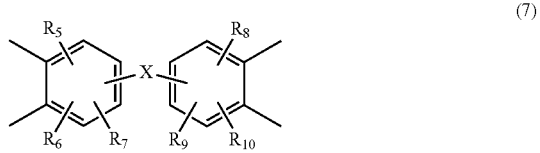

(7)

-continued

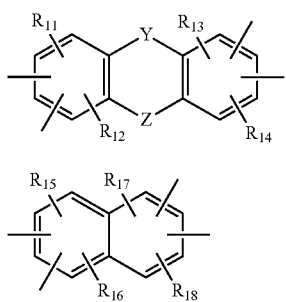
(8)

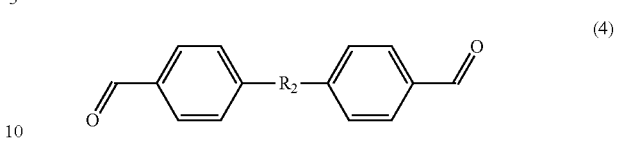
(4)

(9)

wherein X, Y and Z are each independently —CH$_2$—, —O—, —S—, —SO—, —SO$_2$—, —SO$_2$NH—, —CO—, —CO$_2$—, —NHCO—, —NHCONH—, —C(CF$_3$)$_2$—, —CF$_2$—, —C(CH$_3$)$_2$—, —CH(CH$_3$)—, —Si(R$_{19}$)$_2$—, —O—Si(R$_{20}$)$_2$—O—, —Si(R$_{21}$)$_2$—O—Si(R$_{22}$)$_2$—, —(CH$_2$)$_a$—Si(R$_{22}$)$_2$—O—Si(R$_{23}$)$_2$—(CH$_2$)$_a$—, wherein a is an integer of 0 to 6, or a direct bond; and R$_5$ to R$_{23}$ are each independently a hydrogen atom, a fluorine atom, an alkyl group having 1 to 6 carbon atoms, an alkoxyl group having 1 to 6 carbon atoms, or —(CF$_2$)$_b$—CF$_3$ or —O—(CF$_2$)$_b$—CF$_3$ wherein b is an integer of 0 to 5.

4. A resin film comprising the polybenzoxazole resin as claimed in claim 1.

5. A polybenzoxazole precursor comprising a repeating unit represented by the following general formula (2):

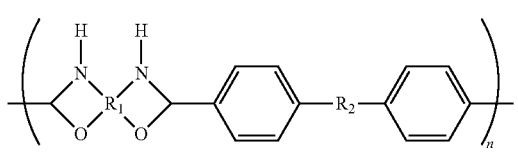
(2)

wherein R$_1$ is a tetravalent aromatic group; N atoms and O atoms which are bonded to R$_1$ are present in the form of pairs each consisting of an N atom and an O atom such that the N atom and the O atom in each pair are respectively bonded to adjacent two carbon atoms constituting the same aromatic ring in R$_1$; R$_2$ is an alkanediyl group having 2 to 6 carbon atoms and benzene rings on each side adjacent R$_2$ are distanced from each other by at least 2 carbon atoms of R$_2$; and n is an integer of 2 to 10000.

6. A process for producing the polybenzoxazole precursor as claimed in claim 5, comprising reacting a compound represented by the following general formula (3) with a dialdehyde compound represented by the following general formula (4):

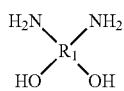
(3)

wherein R$_1$ is a tetravalent aromatic group; and NH$_2$ groups and OH groups which are bonded to R$_1$ are present in the form of pairs each consisting of an NH$_2$ group and an OH group such that the NH$_2$ group and the OH group in each pair are respectively bonded to adjacent two carbon atoms constituting the same aromatic ring in R$_1$; and

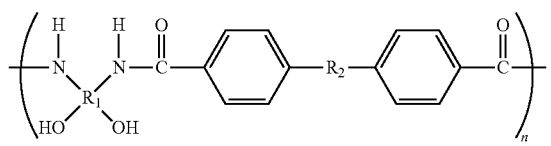
(4)

wherein R$_2$ is an alkanediyl group having 2 to 6 carbon atoms and benzene rings on each side adjacent R$_2$ are distanced from each other by at least 2 carbon atoms of R$_2$.

7. A coating composition comprising the polybenzoxazole precursor as claimed in claim 5.

8. A polybenzoxazole precursor comprising a repeating unit represented by the following general formula (5):

(5)

wherein R$_1$ is a tetravalent aromatic group; N atoms and OH groups which are bonded to R$_1$ are present in the form of pairs each consisting of an N atom and an OH group such that the N atom and the OH group in each pair are respectively bonded to adjacent two carbon atoms constituting the same aromatic ring in R$_1$; R$_2$ is an alkanediyl group having 2 to 6 carbon atoms and benzene rings on each side adjacent R$_2$ are distanced from each other by at least 2 carbon atoms of R$_2$; and n is an integer of 2 to 10000.

9. A process for producing the polybenzoxazole precursor as claimed in claim 8, comprising reacting a compound represented by the following general formula (3) with a compound represented by the following general formula (6):

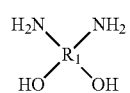
(3)

wherein R$_1$ is a tetravalent aromatic group; and NH$_2$ groups and OH groups which are bonded to R$_1$ are present in the form of pairs each consisting of an NH$_2$ group and an OH group such that the NH$_2$ group and the OH group in each pair are respectively bonded to adjacent two carbon atoms constituting the same aromatic ring in R$_1$; and

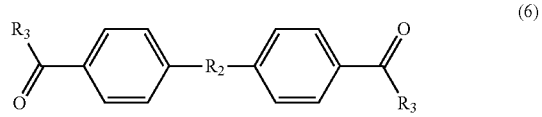
(6)

wherein $R_2$ is an alkanediyl group having 2 to 6 carbon atoms and benzene rings on each side adjacent $R_2$ are distanced from each other by at least 2 carbon atoms of $R_2$; $R_3$ is any of OH, Cl, Br, I and $OR_4$; and $R_4$ is a hydrocarbon group having 3 or less carbon atoms.

10. A coating composition comprising the polybenzoxazole precursor as claimed in claim 8.

* * * * *